United States Patent
Duan

(10) Patent No.: US 12,333,824 B2
(45) Date of Patent: Jun. 17, 2025

(54) OBJECT DETECTION METHOD AND APPARATUS FOR VEHICLE, DEVICE, VEHICLE AND MEDIUM

(71) Applicant: Xiaomi EV Technology Co., Ltd., Beijing (CN)

(72) Inventor: Zhixiang Duan, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 401 days.

(21) Appl. No.: 17/889,667

(22) Filed: Aug. 17, 2022

(65) Prior Publication Data

US 2023/0326216 A1 Oct. 12, 2023

(30) Foreign Application Priority Data

Apr. 12, 2022 (CN) .......................... 202210384004.9

(51) Int. Cl.
*G06V 20/58* (2022.01)
*G01S 13/89* (2006.01)

(52) U.S. Cl.
CPC .............. *G06V 20/58* (2022.01); *G01S 13/89* (2013.01)

(58) Field of Classification Search
None
See application file for complete search history.

(56) References Cited

U.S. PATENT DOCUMENTS

| | | | |
|---|---|---|---|
| 2021/0063578 A1* | 3/2021 | Wekel | G01S 17/894 |
| 2021/0365707 A1* | 11/2021 | Mao | G06V 10/25 |
| 2023/0282000 A1* | 9/2023 | Pang | G01S 7/412 |
| | | | 382/103 |
| 2023/0303113 A1* | 9/2023 | Teo | G01S 13/931 |

FOREIGN PATENT DOCUMENTS

| | | |
|---|---|---|
| CN | 103093191 A | 5/2013 |
| CN | 109191509 A | 1/2019 |
| CN | 111583663 A | 8/2020 |
| CN | 113447923 A | 9/2021 |
| CN | 114241195 A | 3/2022 |

(Continued)

OTHER PUBLICATIONS

Li et al ("Enhancing 3-D LiDAR Point Clouds With Event-Based Camera," in IEEE Transactions on Instrumentation and Measurement, vol. 70, pp. 1-12, Jul. 26, 2021, Art No. 9511712, doi: 10.1109/TIM.2021.3097862) (Year: 2021).*

(Continued)

*Primary Examiner* — Leon Viet Q Nguyen
(74) *Attorney, Agent, or Firm* — Volpe Koenig

(57) ABSTRACT

An object detection method, the method includes: determining an object event image from event images collected by an event camera in the case of obtaining an original radar point cloud; obtaining, by projecting the original radar point cloud according to a pre-calibrated extrinsic matrix, relative to the event camera, of a radar, a projected point cloud of the original radar point cloud in a coordinate system of the event camera; determining an object radar point from the original radar point cloud according to a positional relation between projected points in the projected point cloud and an image contour in the object event image; and performing object detection according to the object radar point.

14 Claims, 4 Drawing Sheets

(56) References Cited

FOREIGN PATENT DOCUMENTS

WO      2020/233443  A1    11/2020
WO      2020/243962  A1    12/2020

OTHER PUBLICATIONS

Song et al ("Calibration of Event-based Camera and 3D LIDAR", 2018 WRC Symposium on Advanced Robotics and Automation (WRC SARA), IEEE, Aug. 16, 2018 (Aug. 16, 2018), pp. 289-295, XP033482828, DOI: 10.1109/WRC-SARA.2018.8584215) (Year: 2018).*

Xiaohui, J., "Research on extrinsic parameter calibration method between Solid-State LiDAR-camera system"; Laser Journal (2022).

Peng, P., "Automatic Recalibration of Camera and LiDAR Using Sensor Fusion Odometry", Journal of Mechanical Engineering (2021).

Li Boyang et al: "Enhancing 3-D LiDAR Point Clouds With Event-Based Camera", IEEE Transactions on Instrumentation Andmeasurement, IEEE, USA, vol. 70, Jul. 26, 2021 (Jul. 26, 2021), pp. 1-12; type-X.

Song Rihui et al: "Calibration of Event-based Camera and 3D LiDAR",2018 WRC Symposium on Advanced Robotics and Automation (WRC SARA), IEEE, Aug. 16, 2018 (Aug. 16, 2018), pp. 289-295; type-A.

Extended European Search Report issued on Aug. 4, 2023 for European Patent Application No. 22193117.3.

Notification to Grant Patent Right issued on Aug. 21, 2023 of Chinese Patent Application No. 202210384004.9.

\* cited by examiner

US 12,333,824 B2

OBJECT DETECTION METHOD AND APPARATUS FOR VEHICLE, DEVICE, VEHICLE AND MEDIUM

CROSS REFERENCE TO RELATED APPLICATIONS

The present application claims the benefit of priority to Chinese Application No. 2022103840049, filed on Apr. 12, 2022, the contents of which are incorporated herein by reference in their entireties for all purposes.

BACKGROUND

An event camera is used for returning an event in a certain format when a brightness value of a spot of a certain pixel in view changes. Compared with a traditional camera, it can sensitively capture other dynamic road participants in the surrounding driving environment during vehicle driving on account of its sensitivity to a moving object, and can also capture pixel changes within a short time interval with low delay, thus improving accuracy of determining a driving strategy of the vehicle relative to other road participants.

SUMMARY

The disclosure provides an object detection method and apparatus for a vehicle, a device, the vehicle and a medium.

According to a first aspect of examples of the disclosure, an object detection method for a vehicle is provided, and includes: determining an object event image from event images collected by an event camera in the case of obtaining an original radar point cloud; obtaining, by projecting the original radar point cloud according to a pre-calibrated extrinsic matrix, relative to the event camera, of a radar, a projected point cloud of the original radar point cloud in a coordinate system of the event camera; determining an object radar point from the original radar point cloud according to a positional relation between projected points in the projected point cloud and an image contour in the object event image; and performing object detection according to the object radar point.

According to a second aspect of examples of the disclosure, an object detection apparatus for a vehicle is provided, and includes: a first determination module configured to determine an object event image from event images collected by an event camera in the case of obtaining an original radar point cloud; a projection module configured to obtain, by projecting the original radar point cloud according to a pre-calibrated extrinsic matrix, relative to the event camera, of a radar, a projected point cloud of the original radar point cloud in a coordinate system of the event camera; a second determination module configured to determine an object radar point from the original radar point cloud according to a positional relation between projected points in the projected point cloud and an image contour in the object event image; and a detection module configured to perform object detection according to the object radar point.

According to a third aspect of examples of the disclosure, an electronic device is provided, and includes: a processor, a memory configured to store an instruction executable by the processor; where the processor is configured to: determine an object event image from event images collected by an event camera in the case of obtaining an original radar point cloud; obtain, by projecting the original radar point cloud according to a pre-calibrated extrinsic matrix, relative to the event camera, of a radar, a projected point cloud of the original radar point cloud in a coordinate system of the event camera; determine an object radar point from the original radar point cloud according to a positional relation between projected points in the projected point cloud and an image contour in the object event image; and perform object detection according to the object radar point.

According to a fourth aspect of examples of the disclosure, a vehicle is further provided. The vehicle includes the above electronic device in the third aspect.

According to the fifth aspect of examples of the disclosure, a non-temporary computer readable storage medium is further provided, storing a computer program instruction, where the program instruction implements steps of the object detection method for a vehicle when executed by a processor, the method including: determining an object event image from event images collected by an event camera in the case of obtaining an original radar point cloud; obtaining, by projecting the original radar point cloud according to a pre-calibrated extrinsic matrix, relative to the event camera, of a radar, a projected point cloud of the original radar point cloud in a coordinate system of the event camera; determining an object radar point from the original radar point cloud according to a positional relation between projected points in the projected point cloud and an image contour in the object event image; and performing object detection according to the object radar point.

It should be understood that the above general description and the following detailed description are merely illustrative and explanatory, and may not limit the disclosure.

BRIEF DESCRIPTION OF THE DRAWINGS

Accompanying drawings described herein are incorporated in the specification and constitute a portion of the specification, and examples consistent with the disclosure are described to explain principles of the disclosure together with the specification.

DETAILED DESCRIPTION

Examples will be described in detail herein, instances of which are illustrated in the accompanying drawings. When the following description refers to the accompanying drawings, the same numbers in different accompanying drawings represent the same or similar elements unless otherwise indicated. Implementation manners described in the following examples do not represent all implementation manners consistent with the disclosure. On the contrary, they are merely examples of apparatuses and methods consistent with some aspects of the disclosure as detailed in the appended claims.

The disclosure relates to the technical field of vehicle engineering, in particular to an object detection method and apparatus for a vehicle, a device, the vehicle and a medium.

In relevant scenes, based on a convolutional neural network, features of an event image with a fixed frame length collected by the event camera are extracted, and object detection is performed according to the extracted features. However, it is difficult for object detection based on the features of the event image with a fixed frame length to satisfy a timeliness requirement of vehicle driving, and accuracy of object detection results based on the event image alone is low.

Figure 1:
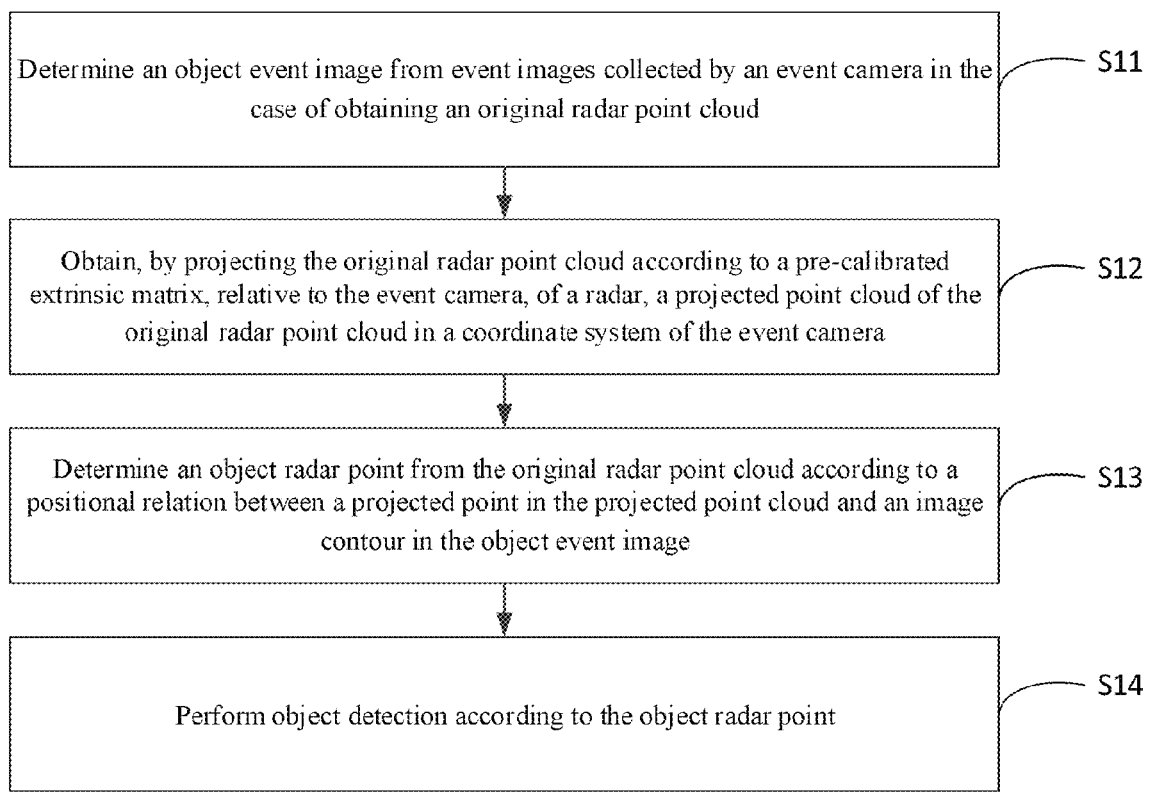
FIG. 1 is a flowchart of an object detection method for a vehicle according to an example.

FIG. 1 is a flowchart of an object detection method for a vehicle according to an example. As shown in FIG. 1, the method may be applied to a vehicle-mounted terminal, for example, a vehicle driver assistant system or a vehicle automation system. The method includes:

Step S11, an object event image is determined from event images collected by an event camera in the case of obtaining an original radar point cloud.

In the example of the disclosure, one or more frames of object event images may be determined from the event images collected by the event camera.

The step of determining an object event image from event images collected by an event camera in the case of obtaining an original radar point cloud includes:

by taking a radar collection time point of the original radar point cloud as a start point, the event images collected by the event camera are reversely queried in the case of obtaining the original radar point cloud, and an event image within preset event accumulation duration is determined as the object event image.

On the basis of the above example, the event accumulation duration is determined according to a frequency of collecting the original radar point cloud by the radar.

In order to guarantee the sufficient number of frames of the object event images, the event accumulation duration is negatively correlated with the frequency of collecting the original radar point cloud by the radar. That is, the lower the collection frequency is, the longer the event accumulation duration is.

For example, the event accumulation duration may be determined in the following formula t: $t=1/n$, where n is the frequency of collecting the original radar point cloud by the radar. For example, if the frequency of collecting the original radar point cloud is 10 Hz, a current collection time point of the original radar point cloud by the radar is taken as the start point, and event images collected by the event camera within 0.1 s are reversely queried, and the event images within 0.1 s are taken as the object event images.

For example, if a first original radar point cloud is collected at 15:19:40.5 and a second original radar point cloud is collected at 15:19:40.6, by taking 15:19:40.6 as a start point, event images collected, within past 0.1 s (15:19:40.5-15:19:40.6) by the event camera are reversely queried in the case of obtaining the second original radar point cloud, and the event image is obtained.

For example, the event camera collects event images three times from 15:19:40.5 to 15:19:40.6, and the event images collected three times are taken as the object event images.

The event image includes x-coordinate x, y-coordinate y, a time stamp and a luminance polarity value of a pixel whose luminance value changes, and the luminance polarity value is used to indicate whether the luminance value of the pixel increases or decreases. For example, when the luminance polarity value is +1, the luminance value of the pixel increases, the luminance polarity value is −1, and the luminance value of the pixel decreases.

Step S12, by projecting the original radar point cloud according to a pre-calibrated extrinsic matrix, relative to the event camera, of a radar, a projected point cloud of the original radar point cloud in a coordinate system of the event camera is obtained.

Figure 2:
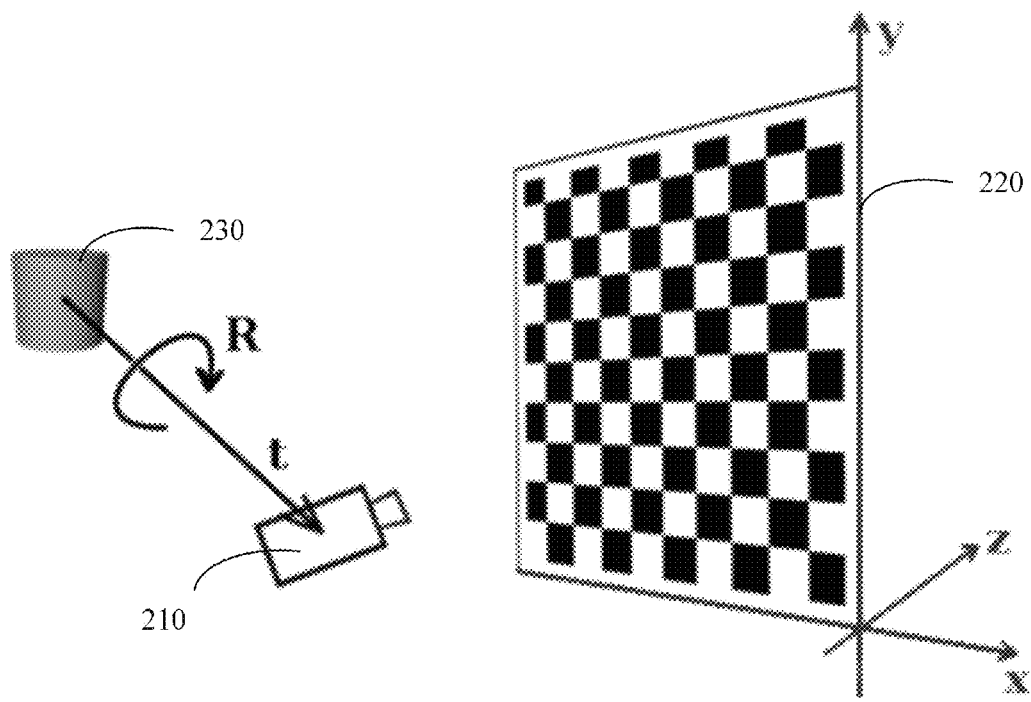
FIG. 2 is a schematic diagram showing calibration of an extrinsic matrix according to an example.

In the example of the disclosure, the extrinsic matrix includes rotation matrix R and translation vector t, relative to the event camera, of the radar, as shown in FIG. 2.

The projected point cloud in the coordinate system of the event camera is a two-dimensional point cloud, that is, according to the pre-calibrated extrinsic matrix, relative to the event camera, of the radar, the two-dimensional projected point cloud is obtained by rotating and translating a three-dimensional original radar point cloud.

Step S13, an object radar point is determined from the original radar point cloud according to a positional relation between a projected point in the projected point cloud and an image contour in the object event image.

If multi-frame object event images are obtained, an object radar point corresponding to each frame of object event image are determined respectively from the original radar point cloud according to a positional relation between the projected points in the projected point cloud and an image contour in each frame of object event image.

In the example of the disclosure, the positional relation between the projected point in the projected point cloud and the image contour in the object event image includes that the projected point in the projected point cloud falls within the image contour in the object event image and that the projected point in the projected point cloud falls outside the image contour in the object event image.

In the example of the disclosure, a dynamic target label is added to the projected point, falling within the image contour of the event contour image, in the projected point cloud and a background target label is added to the projected point, falling outside the image contour of the event contour image, in the projected point cloud.

Further, according to a projection relation between the original radar point in the original radar point cloud and the projected point in the projected point cloud, a target label is added to an original radar point corresponding to the projected point to which the dynamic target label is added, and a non-target label is added to an original radar point corresponding to the projected point to which the background target label is added.

Further, the original radar point to which the non-target label is added in the original radar point cloud is removed, the original radar point to which the target label is added in the original radar point cloud is kept, and the kept original radar point is used as the object radar point.

Step S14, object detection is performed according to the object radar point.

In the example of the disclosure, the object radar point cloud is constructed according to the object radar points, and then a frame of objects to be identified is generated according to the object radar point cloud, and a corresponding matrix of features to be identified is obtained by projecting the frame of objects to be identified onto a feature map. Further, an object detection result is obtained by subjecting the matrix of features to be identified to convolution processing, pooling processing and full connection processing.

If multi-frame object event images are obtained, the object radar point cloud is constructed according to object radar points corresponding to the multi-frame object event images.

According to the technical solution above, the object event image is determined from the event images collected by the event camera in the case of obtaining the original radar point cloud; by projecting the original radar point cloud according to the pre-calibrated extrinsic matrix, relative to the event camera, of the radar, the projected point cloud of the original radar point cloud is obtained in the coordinate system of the event camera; the object radar point is determined from the original radar point cloud according to the positional relation between the projected point in the projected point cloud and the image contour in the object event image; and object detection is performed according to the object radar point. By projecting the original point cloud collected by radar onto the event images of the event camera, the object radar point may be determined from the radar point cloud, and by performing object identification on the object radar point, perception timeliness and accuracy may be improved.

On the basis of the above example, the step S13 of determining an object radar point from the original radar point cloud according to a positional relation between a projected point in the projected point cloud and an image contour in the object event image includes:

an object projected point is determined from the projected points according to the positional relation between the projected points in the projected point cloud and the image contour in the object event image.

In the example of the disclosure, a background target label is merely added to the projected point, falling within the image contour of the event contour image, in the projected point cloud and the projected point, falling outside the image contour of the event contour image, in the projected point cloud is directly removed.

An original radar point, projected to obtain the object projected point, in the original radar point cloud is taken as the object radar point.

It is worth noting that the same projected point in the projected point cloud may be obtained by projecting one or more original radar points in the original radar point cloud, and the object projected point may correspond to one or more original radar points.

In the technical solution, it is not necessary to add labels to and eliminate original radar points, in the original radar point cloud, projected to obtain non-object projected points, but merely labels are added to the object projected points and the original radar points, in the original radar point cloud, projected to obtain the object projected points, which may reduce the computation data amount and improve the computation speed.

On the basis of the above example, since the same projected point in the projected point cloud may be obtained by projecting one or more original radar points in the original radar point cloud, and computation amount is undoubtedly increased if the dynamic target label is added to each projected point obtained through projection each time, the determining an object projected point from the projected points according to the positional relation between the projected points in the projected point cloud and the image contour in the object event image includes:

projected points, falling within the image contour of the event outline image, in the projected point cloud are taken as candidate projected points.

In the example of the disclosure, the projected points, falling within the image contour of the event outline image, in the projected point cloud are taken as the candidate projected points, and projected points, falling outside the image contour of the event outline image, in the projected point cloud are removed.

The object projected point is obtained by removing duplicates from the candidate projected point according to coordinates of the candidate projected points.

Based on the K nearest neighbors (KNN) algorithm, according to the coordinates of the candidate projected points, the object projected points are obtained by removing the duplicates from the candidate projected point, and then the dynamic target label may be added to the object projected points.

In the technical solution, the duplicates are removed first from the projected points, and then the labels are added to the object projected points from which the duplicates removed, which may avoid repeated labeling, reduce the computation amount and improve the computation speed.

In some examples, the extrinsic matrix, relative to the event camera, of the radar is pre-calibrated in the following manner:

by configuring checkerboard parameters of a calibration target, the calibration target is generated according to the checkerboard parameters of the calibration target.

In the example of the disclosure, the checkerboard parameters of the calibration target include a side length of each checkerboard in the calibration target and the number of checkerboards. The number of checkerboards is determined by the number of checkerboards in a length direction and the number of checkerboards in a width direction.

For example, the side length of each calibration target in the calibration target may be determined according to a focal length of the event camera.

By importing a calibration sample image collected by the event camera into the calibration target, a calibration sample point cloud captured from the calibration sample image is displayed on the calibration target.

In the example of the disclosure, as shown in FIG. 2, the calibration sample image is obtained by collecting a calibrated gray card 220 by the event camera 210.

A calibration center point is selected from the calibration sample point cloud repeatedly.

A calibration sample point cloud in a central area of the checkerboard may be selected as the calibration center point for constructing a circular calibration area, and an outward plane normal vector of the circular calibration area constructed by the calibration sample point cloud selected as far as possible is perpendicular to a plane of the calibration target.

Based on a calibration window and the calibration center point selected each time and according to intrinsic characteristics of the event camera and intrinsic characteristics of the radar, the extrinsic matrix, relative to the event camera, of the radar 230 is obtained.

By switching a single frame picture window to a point cloud window, an effect and error of alignment of the captured image of each frame to the point cloud. If the error is less than a calibration error, it is determined that the extrinsic matrix obtained in this case is accurate. Through the selected calibration center point obtained many times, the extrinsic matrix calibrated many times is obtained. Specific calibration may be done with Autoware.

In some examples, the image contour in the object event image is extracted in the following manner:

the object event image is converted into a gray event image.

In the example of the disclosure, values of three color channels (values of R, G and B color channels) of pixels in the object event image may be determined, and the object event image may be converted into the gray event image by taking an average of the values of the three color channels as a gray threshold. It is also possible to calculate the product of a preset value component of each color channel and the value of each color channel, then the gray threshold is obtained after summing, and the object event image is converted into the gray event image.

By binarizing the gray event image, a black-and-white event image corresponding to the object event image is obtained.

The gray event image is generally binarized with a median value, a gray average or a gray histogram, which is not repeated herein.

Gaussian filter is performed on the black-and-white event image.

The value of each pixel is determined by calculating a weighted average of the black-and-white event image. For example, a template (or convolution and mask) is used to scan each pixel in the black-and-white event image, and a weighted average gray value of pixels in a neighborhood determined by the template is used to replace a value of a central pixel of the template.

By extracting a contour of the black-and-white event image subjected to Gaussian filter, the image contour of the object event image is obtained.

The black-and-white event image in the disclosure is binarized, and the contour extraction of the black-and-white event image after Gaussian filter may be performed by cutting out internal points. That is, if any pixel in the black-and-white event image after Gaussian filter is black, and all eight pixels adjacent to the pixel are black, the pixel is deleted; and if any pixel in the black-and-white event image after Gaussian filter is black, and any one of eight pixels adjacent to the pixel is white, the pixel is kept until all pixels are traversed, and the image contour of the object event image is obtained.

Figure 3:
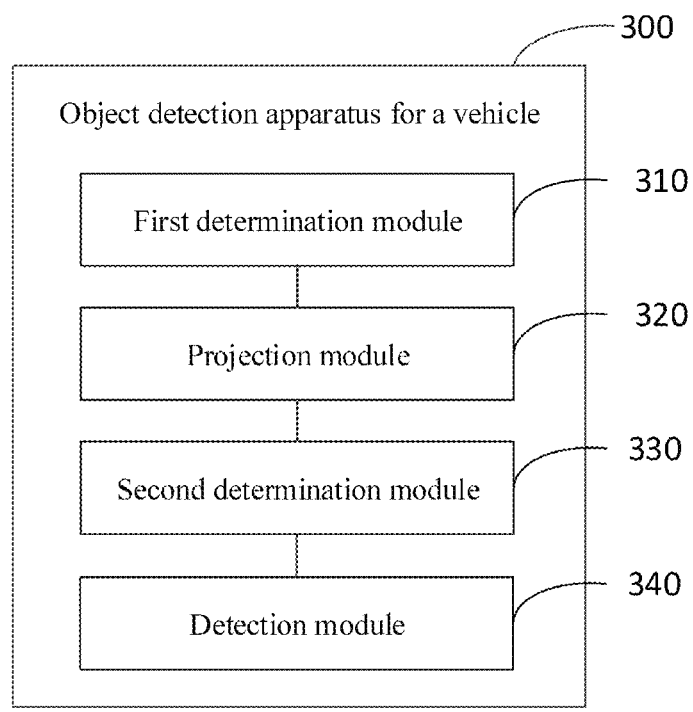
FIG. 3 is a block diagram of an object detection device for a vehicle according to an example.

Based on the same concept, the disclosure further provides an object detection apparatus for a vehicle which is used to execute part or all of the steps of the object detection method for a vehicle provided by the above method examples. The apparatus 300 may achieve the object detection method for a vehicle by software, hardware or a combination of both. FIG. 3 is a block diagram of an object detection apparatus for a vehicle according to an example. As shown in FIG. 3, the apparatus 300 includes: a first determination module 310, a projection module 320, a second determination module 330 and a detection module 340.

The first determination module 310 is configured to determine an object event image from event images collected by an event camera in the case of obtaining an original radar point cloud.

The projection module 320 is configured to obtain, by projecting the original radar point cloud according to a pre-calibrated extrinsic matrix, relative to the event camera, of a radar, a projected point cloud of the original radar point cloud in a coordinate system of the event camera.

The second determination module 330 is configured to determine an object radar point from the original radar point cloud according to a positional relation between a projected point in the projected point cloud and an image contour in the object event image.

The detection module 340 is configured to perform object detection according to the object radar point.

According to the apparatus, by projecting the original point cloud collected by radar onto the event images of the event camera, the object radar point may be determined from the radar point cloud, and by performing object identification on the object radar point, perception timeliness and accuracy may be improved.

In some examples, the second determination module 330 includes:

a first determination sub-module configured to determine an object projected point from the projected points according to the positional relation between the projected points in the projected point cloud and the image contour in the object event image; and a second determination sub-module configured to take an original radar point, projected to obtain the object projected point, in the original radar point cloud as the object radar point.

In some examples, the first determination sub-module is configured to:

take projected points, falling within the image contour of the event outline image, in the projected point cloud as candidate projected points; and obtain the object projected point by removing duplicates from the candidate projected point according to coordinates of the candidate projected points.

In some examples, the first determination module 310 is configured to reversely query, by taking a radar collection time point of the original radar point cloud as a start point, the event images collected by the event camera in the case of obtaining the original radar point cloud, and determine an event image within preset event accumulation duration as the object event image.

In some examples, the event accumulation duration is determined according to a frequency of collecting the original radar point cloud by the radar.

In some examples, the apparatus 300 includes a calibration module configured to calibrate the extrinsic matrix, relative to the event camera, of the radar in the following manner:

by configuring checkerboard parameters of a calibration target, the calibration target is generated according to the parameters of the calibration target;

by importing a calibration sample image collected by the event camera into the calibration target, a calibration sample point cloud captured from the calibration sample image is displayed on the calibration target;

a calibration center point is selected from the calibration sample point cloud repeatedly; and based on a calibration window and the calibration center point selected each time and according to intrinsic characteristics of the event camera and intrinsic characteristics the radar, the extrinsic matrix, relative to the event camera, of the radar is obtained.

In some examples, the second determining module 330 is configured to extract the image contour of the object event image in the following manner:

the object event image is converted into a gray event image;

by binarizing the gray event image, a black-and-white event image corresponding to the object event image is obtained;

Gaussian filter is performed on the black-and-white event image; and by extracting a contour of the black-and-white event image subjected to Gaussian filter, the image contour of the object event image is obtained.

Regarding the apparatus in the above example, a specific manner in which each module executes operation has been described in detail in an example related to the method, and thus will not described in detail herein.

In addition, it is worth noting that, for the convenience and conciseness of description, the examples described in the specification are all preferred examples, and the parts involved are not necessarily necessary for the disclosure. For example, the second determination module 330 and the detection module 340 may be independent apparatuses or the same apparatus in specific implementation, and are not defined in the disclosure.

According to the example of the disclosure, an electronic device is further provided, and includes:
- a processor,
- a memory configured to store an instruction executable by the processor;
- where the processor is configured to:
  - determine an object event image from event images collected by an event camera in the case of obtaining an original radar point cloud;
  - obtain, by projecting the original radar point cloud according to a pre-calibrated extrinsic matrix, relative to the event camera, of a radar, a projected point cloud of the original radar point cloud in a coordinate system of the event camera;
  - determine an object radar point from the original radar point cloud according to a positional relation between projected points in the projected point cloud and an image contour in the object event image; and
  - perform object detection according to the object radar point.

According to the example of the disclosure, a vehicle is further provided. The vehicle includes the above electronic device.

According to the example of the disclosure, a computer readable storage medium is further provided, storing a computer program instruction, where the program instruction implements steps of the method of any one above when executed by a processor.

Figure 4:
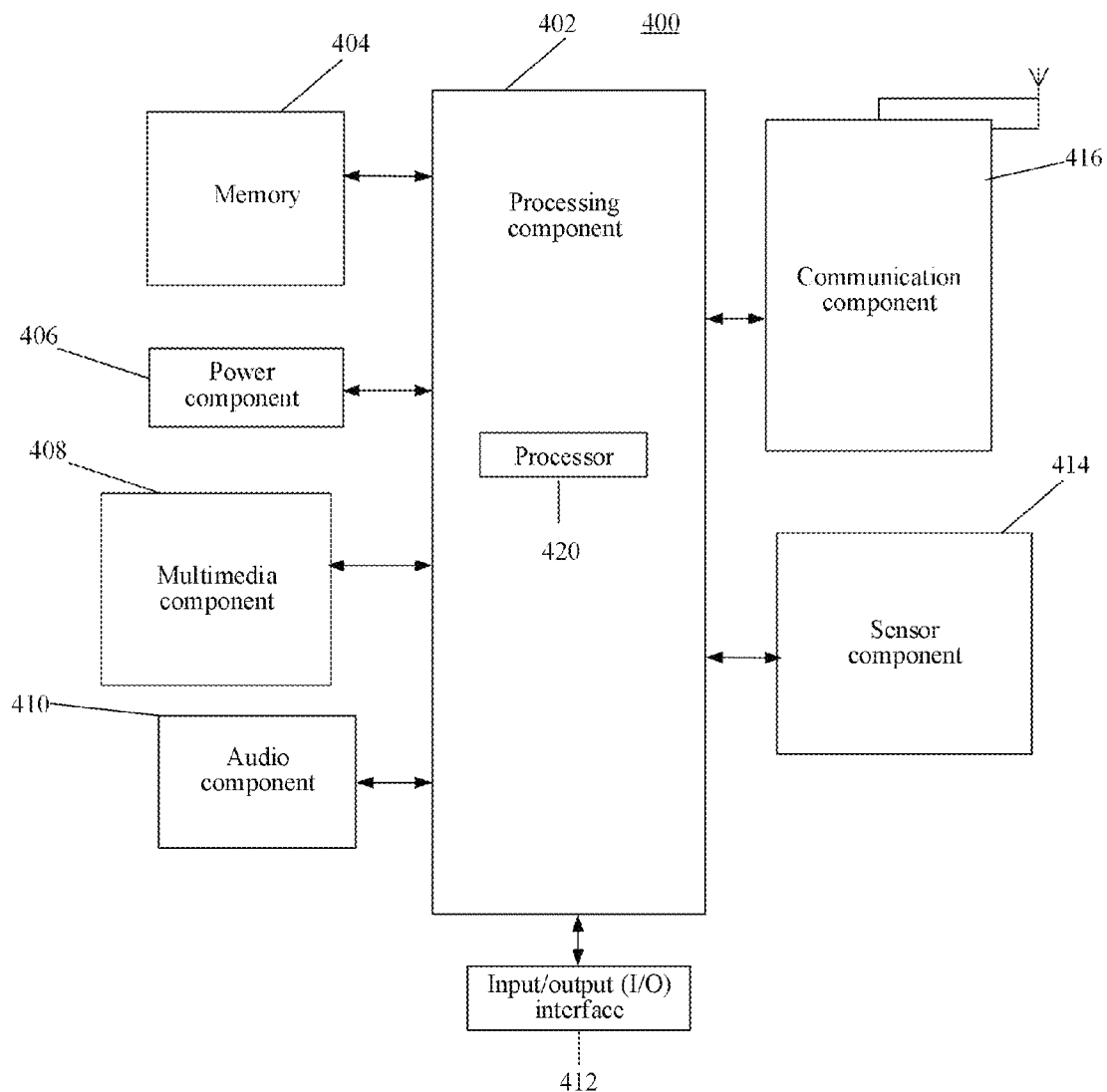
FIG. 4 is a block diagram of an object detection apparatus for a vehicle according to an example.

FIG. 4 is a block diagram of an object detection apparatus 400 for a vehicle according to an example. For example, the apparatus 400 may be a controller of a vehicle driver assistance system or a vehicle automation system.

With reference to FIG. 4, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 generally controls overall operations of the apparatus 400, such as operations related to displaying, telephone calls, data communications, camera operations, and recording operations. The processing component 402 may include one or more processors 420 to execute instructions, so as to complete all or part of the steps of the object detection method for a vehicle described above. In addition, the processing component 402 may include one or more modules to facilitate interaction between the processing component 402 and other components. For example, the processing component 402 may include a multimedia module to facilitate interaction between the multimedia component 408 and the processing component 402.

The memory 404 is configured to store various types of data to support the operation of the apparatus 400. Instances of such data include instructions for any application program or method operated on the apparatus 400, pictures, videos, etc. The memory 404 may be implemented by any type of volatile or non-volatile storage devices or their combination, such as Static Random Access Memory (SRAM), an Electrically Erasable Programmable Read-Only Memory (EEPROM), a Programming Read-Only Memory (EPROM), a Programmable Read-Only Memory (PROM), a Read-Only Memory (ROM), a magnetic memory, a flash memory, a magnetic disk or an optical disk.

The power component 406 provides power for various components of the apparatus 400. The power component 406 may include a power management system, one or more power supplies, and other components associated with generating, managing, and distributing power for the apparatus 400.

The multimedia component 408 includes a screen providing an output interface between the apparatus 400 and a user. In some examples, the screen may include a liquid crystal display (LCD) and a touch panel (TP). If including the TP, the screen may be implemented as a touch screen to receive an input signal from a user. The TP includes one or more touch sensors to sense touch, swipe, and gestures on the TP. The touch sensors may not only sense a boundary of a touch or swipe action, but also detect a time of duration and a pressure associated with the touch or swipe action. In some examples, the multimedia component 408 includes at least an event camera. The event camera may collect event images while the apparatus 400 is in an operation mode, such as a photographing mode or a video mode. The event camera may be fixed optical lens systems or may have focal lengths and optical zoom capabilities.

The audio component 410 is configured to output and/or input audio signals. For example, the audio component 410 includes a microphone (MIC), and the microphone is configured to receive an external audio signal when the apparatus 400 is in an operation mode, such as a recording mode, and a voice identification mode. The received audio signals may be further stored in the memory 404 or transmitted via the communication component 416. In some examples, the audio component 410 may further include a speaker to output audio signals.

The I/O interface 412 provides an interface between the processing component 402 and peripheral interface modules, which may be keyboards, click wheels, buttons, etc. These buttons may include, but not limited to: a home button, a volume button, a start button, and a lock button.

The sensor component 414 includes one or more sensors configured to provide various aspects of state assessment for the apparatus 400. For example, the sensor component 414 may detect an on/off status of the apparatus 400, and relative positioning of components. For example, the component is a display and a keypad of the apparatus 400. The sensor component 414 may also detect a change in position of the apparatus 400 or a component of the apparatus 400, presence or absence of user contact with the apparatus 400, an orientation or an acceleration/deceleration of the apparatus 400, and a change in temperature of the apparatus 400. The sensor component 414 may include a proximity sensor configured to detect the presence of objects nearby without any physical contact. The sensor component 414 may also include light sensors, such as complementary metal-oxide-semiconductor transistor (CMOS) or charge coupled device (CCD) image sensors, for use in imaging applications. In some examples, the sensor component 414 may also include an acceleration sensor, a gyroscope sensor, a magnetic sensor, a pressure sensor, or a temperature sensor.

The communication component 416 is configured to facilitate wired or wireless communications between the apparatus 400 and other devices. The apparatus 400 may access a wireless network based on a communication standard, such as WiFi, 2G, 3G, 4G or 5G, or their combination. In an example, the communication component 416 receives a broadcast signal or broadcast related information from an external broadcast management system via a broadcast channel. In one example, the communication component 416 further includes a Near Field Communication (NFC)

module to promote short-range communications. For example, the NFC module may be implemented based on a Radio Frequency Identification (RFID) technology, an Infrared Data Association (IrDA), an Ultra-Wide Band (UWB) technology, a Bluetooth (BT) technology and other technologies.

In an example, the apparatus 400 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, and is configured to execute the object detection method for a vehicle above.

In the example, a non-transitory computer-readable storage medium including an instruction, such as a memory 404 including an instruction, is further provided. The instruction may be executed by a processor 420 of an apparatus 400 to complete the object detection method for a vehicle above. For example, the non-transitory computer readable storage medium may be a Read Only Memory (ROM), a Random Access Memory (RAM), a CD-ROM, a magnetic tape, a floppy disc, an optical data storage device, etc.

In another example, there is also provided a computer program product, the computer program product includes a computer program executable by a programmable apparatus, the computer program having a code portion for executing the object detection method for a vehicle above when executed by the programmable apparatus.

A person of ordinary skill in the art will readily conceive of other implementation solutions of the disclosure after considering the specification and implementing the disclosure. The disclosure is intended to cover any modification, use or adaptive change of the disclosure, which follows general principles of the disclosure and includes common knowledge or conventional technical means in the technical field not disclosed in the disclosure. The specification and the examples are considered as being illustrative merely, with a true scope and spirit of the disclosure being indicated by the following claims.

It should be understood that the disclosure is not limited to precise structures described above and shown in the accompanying drawings, and various modifications and changes can be made without departing from the scope of the disclosure. The scope of the disclosure is limited merely by the appended claims.

What is claimed is:

1. An object detection method for a vehicle, comprising:
    determining an object event image from event images collected by an event camera in the case of obtaining an original radar point cloud;
    obtaining, by projecting the original radar point cloud according to a pre-calibrated extrinsic matrix, relative to the event camera, of a radar, a projected point cloud of the original radar point cloud in a coordinate system of the event camera;
    determining an object radar point from the original radar point cloud according to a positional relation between projected points in the projected point cloud and an image contour in the object event image; and
    performing object detection according to the object radar point;
    wherein determining the object radar point from the original radar point cloud according to the positional relation between the projected points in the projected point cloud and the image contour in the object event image comprises:
        determining an object projected point from the projected points according to the positional relation between the projected points in the projected point cloud and the image contour in the object event image; and
        taking an original radar point, projected to obtain the object projected point, in the original radar point cloud as the object radar point;
    wherein determining the object projected point from the projected points according to the positional relation between the projected points in the projected point cloud and the image contour in the object event image comprises:
        taking projected points, falling within the image contour of the object event image, in the projected point cloud as candidate projected points; and
        obtaining the object projected point by removing duplicates from the candidate projected point according to coordinates of the candidate projected points.

2. The method according to claim 1, wherein determining the object event image from the event images collected by the event camera in the case of obtaining the original radar point cloud comprises:
    reversely querying, by taking a radar collection time point of the original radar point cloud as a start point, the event images collected by the event camera in the case of obtaining the original radar point cloud, and determining an event image within preset event accumulation duration as the object event image.

3. The method according to claim 2, wherein the event accumulation duration is determined according to a frequency of collecting the original radar point cloud by the radar.

4. The method according to claim 1, wherein the extrinsic matrix, relative to the event camera, of the radar is pre-calibrated in the following manner:
    generating, by configuring checkerboard parameters of a calibration target, the calibration target according to the checkerboard parameters;
    displaying, by importing a calibration sample image collected by the event camera into the calibration target, a calibration sample point cloud captured from the calibration sample image on the calibration target;
    selecting a calibration center point from the calibration sample point cloud repeatedly; and
    obtaining, based on a calibration window and the calibration center point selected each time and according to intrinsic characteristics of the event camera and intrinsic characteristics of the radar, the extrinsic matrix, relative to the event camera, of the radar.

5. The method according to claim 1, wherein the image contour in the object event image is extracted in the following manner:
    converting the object event image into a gray event image;
    obtaining, by binarizing the gray event image, a black-and-white event image corresponding to the object event image;
    performing Gaussian filter on the black-and-white event image; and
    obtaining, by extracting a contour of the black-and-white event image subjected to Gaussian filter, the image contour of the object event image.

6. An electronic device, comprising:
    a processor,
    a memory configured to store an instruction executable by the processor;
    wherein the processor is configured to:

determine an object event image from event images collected by an event camera in the case of obtaining an original radar point cloud;

obtain, by projecting the original radar point cloud according to a pre-calibrated extrinsic matrix, relative to the event camera, of a radar, a projected point cloud of the original radar point cloud in a coordinate system of the event camera;

determine an object radar point from the original radar point cloud according to a positional relation between projected points in the projected point cloud and an image contour in the object event image; and perform object detection according to the object radar point;

wherein the processor is further configured to:

determine an object projected point from the projected points according to the positional relation between the projected points in the projected point cloud and the image contour in the object event image; and take an original radar point, projected to obtain the object projected point, in the original radar point cloud as the object radar point;

wherein the processor is further configured to:

take projected points, falling within the image contour of the object event image, in the projected point cloud as candidate projected points; and obtain the object projected point by removing duplicates from the candidate projected point according to coordinates of the candidate projected points.

7. The electronic device according to claim 6, wherein the processor is further configured to:

reversely query, by taking a radar collection time point of the original radar point cloud as a start point, the event images collected by the event camera in the case of obtaining the original radar point cloud, and determining an event image within preset event accumulation duration as the object event image.

8. The electronic device according to claim 7, wherein the event accumulation duration is determined according to a frequency of collecting the original radar point cloud by the radar.

9. The electronic device according to claim 6, wherein the extrinsic matrix, relative to the event camera, of the radar is pre-calibrated in the following manner:

generating, by configuring checkerboard parameters of a calibration target, the calibration target according to the checkerboard parameters;

displaying, by importing a calibration sample image collected by the event camera into the calibration target, a calibration sample point cloud captured from the calibration sample image on the calibration target;

selecting a calibration center point from the calibration sample point cloud repeatedly; and obtaining, based on a calibration window and the calibration center point selected each time and according to intrinsic characteristics of the event camera and intrinsic characteristics of the radar, the extrinsic matrix, relative to the event camera, of the radar.

10. The electronic device according to claim 6, wherein the image contour in the object event image is extracted in the following manner:

converting the object event image into a gray event image;

obtaining, by binarizing the gray event image, a black-and-white event image corresponding to the object event image;

performing Gaussian filter on the black-and-white event image; and obtaining, by extracting a contour of the black-and-white event image subjected to Gaussian filter, the image contour of the object event image.

11. A vehicle, comprising the electronic device according to claim 6.

12. A non-transitory computer readable storage medium, storing a computer program instruction, wherein the program instruction implements steps of the object detection method for a vehicle when executed by a processor, the method comprising:

determining an object event image from event images collected by an event camera in the case of obtaining an original radar point cloud;

obtaining, by projecting the original radar point cloud according to a pre-calibrated extrinsic matrix, relative to the event camera, of a radar, a projected point cloud of the original radar point cloud in a coordinate system of the event camera;

determining an object radar point from the original radar point cloud according to a positional relation between projected points in the projected point cloud and an image contour in the object event image; and performing object detection according to the object radar point;

wherein the program instruction further implements:

determining an object projected point from the projected points according to the positional relation between the projected points in the projected point cloud and the image contour in the object event image; and taking an original radar point, projected to obtain the object projected point, in the original radar point cloud as the object radar point;

wherein the program instruction further implements:

taking projected points, falling within the image contour of the object event image, in the projected point cloud as candidate projected points; and obtaining the object projected point by removing duplicates from the candidate projected point according to coordinates of the candidate projected points.

13. The non-transitory computer readable storage medium according to claim 12, wherein the program instruction further implementing:

reversely querying, by taking a radar collection time point of the original radar point cloud as a start point, the event images collected by the event camera in the case of obtaining the original radar point cloud, and determining an event image within preset event accumulation duration as the object event image.

14. The non-transitory computer readable storage medium according to claim 13, wherein the event accumulation duration is determined according to a frequency of collecting the original radar point cloud by the radar.

* * * * *

UNITED STATES PATENT AND TRADEMARK OFFICE
CERTIFICATE OF CORRECTION

| | | |
|---|---|---|
| PATENT NO. | : 12,333,824 B2 | Page 1 of 1 |
| APPLICATION NO. | : 17/889667 | |
| DATED | : June 17, 2025 | |
| INVENTOR(S) | : Zhixiang Duan | |

It is certified that error appears in the above-identified patent and that said Letters Patent is hereby corrected as shown below:

On the Title Page
On Page 2, Item (56), under "OTHER PUBLICATIONS", in Column 1, Line 13, delete "Andmeasurement," and insert -- And measurement, --, therefor.

In the Specification
In Column 1, Line 9, delete "2022103840049," and insert -- 202210384004.9, --, therefor.
In Column 8, Lines 43-44, delete "characteristics the" and insert -- characteristics of the --, therefor.
In Column 10, Line 21, delete "be" and insert -- have --, therefor.

In the Claims
In Column 12, Line 64, in Claim 6, delete "processor," and insert -- processor; --, therefor.

Signed and Sealed this
Nineteenth Day of August, 2025

Coke Morgan Stewart
*Acting Director of the United States Patent and Trademark Office*